United States Patent

Shute

[15] 3,671,781

[45] June 20, 1972

[54] WAVEFORM RESTORER CIRCUIT

[72] Inventor: Donald W. Shute, Burlington, Mass.

[73] Assignee: Spacetac Incorporated, Burlington, Mass.

[22] Filed: July 8, 1970

[21] Appl. No.: 53,086

[52] U.S. Cl. ....................... 307/252 W, 307/240, 307/268, 307/284, 328/26, 330/9, 330/10

[51] Int. Cl. .................... H03f 3/38, H03k 5/13, H03k 17/56

[58] Field of Search ............ 307/252 J, 252 K, 252 Q, 252 W, 307/268, 240, 284; 328/21, 22, 164, 26; 321/2, 4; 329/166; 330/10; 332/43 B; 323/75 E, 75 F

[56] References Cited

UNITED STATES PATENTS

| | | | |
|---|---|---|---|
| 3,414,797 | 12/1968 | Morgan | 321/2 |
| 3,295,048 | 12/1966 | Wouk et al. | 307/252 K |
| 3,235,711 | 2/1966 | Bergen et al. | 307/252 T |
| 3,308,371 | 3/1967 | Studtmann | 307/252 K |
| 3,430,151 | 2/1969 | Badessa | 332/43 B |
| 3,120,633 | 2/1964 | Genuit | 307/252 L |

*Primary Examiner*—Donald D. Forrer
*Assistant Examiner*—L. N. Anagnos
*Attorney*—Iandiorio & Grodberg, Joseph S. Iandiorio and Lester S. Grodberg

[57] ABSTRACT

Apparatus is disclosed including a waveform restoring circuit for extracting portions of a fundamental waveform from a composite waveform and combining those portions to reproduce the fundamental waveform, including means for producing a series of pulses from the composite waveform, each pulse representing a portion of the fundamental waveform, switching means for selectively conducting the pulses and synchronized control means for driving the switching means to conduct the pulses in a predetermined pattern for reconstructing the fundamental waveform.

10 Claims, 3 Drawing Figures

DONALD W. SHUTE
INVENTOR.

BY

Joseph S. Iandiorio
ATTORNEY.

DONALD W. SHUTE
INVENTOR.
BY
Joseph S. Iandiorio
ATTORNEY.

WAVEFORM RESTORER CIRCUIT

BACKGROUND OF INVENTION

This invention relates to a waveform restorer circuit, and more particularly to such a circuit for extracting portions of a fundamental waveform from a composite waveform and combining those portions to reproduce the fundamental waveform.

In many applications it is required that the size and weight of electronic components be kept to a minimum. One of the major contributors to size and weight of electronic components are transformers, especially those used in low frequency circuits, viz. 60 Hz, because as the frequency of signals submitted to a transformer decreases the size of the transformer must be increased to maintain efficiency. One method of reducing the transformer size is to raise the frequency of the fundamental low frequency signal prior to submission to a transformer and decrease the frequency after the signal has been through the transformer so that the transformer responds to only a high frequency signal and can therefore be operated efficiently though it is small in size. The frequency of the fundamental may be raised by first being rectified and then being submitted to a high frequency chopper which produces a composite waveform including a high frequency signal having an envelope whose amplitude varies at twice the frequency of the fundamental. At the output of the transformer this waveform must be processed to regain the original fundamental. Presently this may be done by a second rectification and chopping operation but this does not necessarily reproduce the fundamental waveform in its original form.

SUMMARY OF INVENTION

It is therefore an object of this invention to provide a waveform restorer circuit which extracts a fundamental waveform from a composite waveform.

It is a further object of this invention to provide such a circuit which extracts portions of a fundamental waveform from a composite waveform and combines those portions to reconstruct the fundamental waveform.

This invention features a waveform restorer circuit for extracting portions of a fundamental waveform from a composite waveform and combining the portions to reproduce the fundamental waveform. There are means for producing a series of pulses from the composite waveform, each pulse representing a portion of the fundamental waveform. Synchronized control means drive the switching means to conduct the pulses in a predetermined pattern for reconstructing the fundamental waveform.

DISCLOSURE OF PREFERRED EMBODIMENTS

Other objects, features and advantages will occur from the following description of preferred embodiments and the accompanying drawings, in which.

Figure 1:
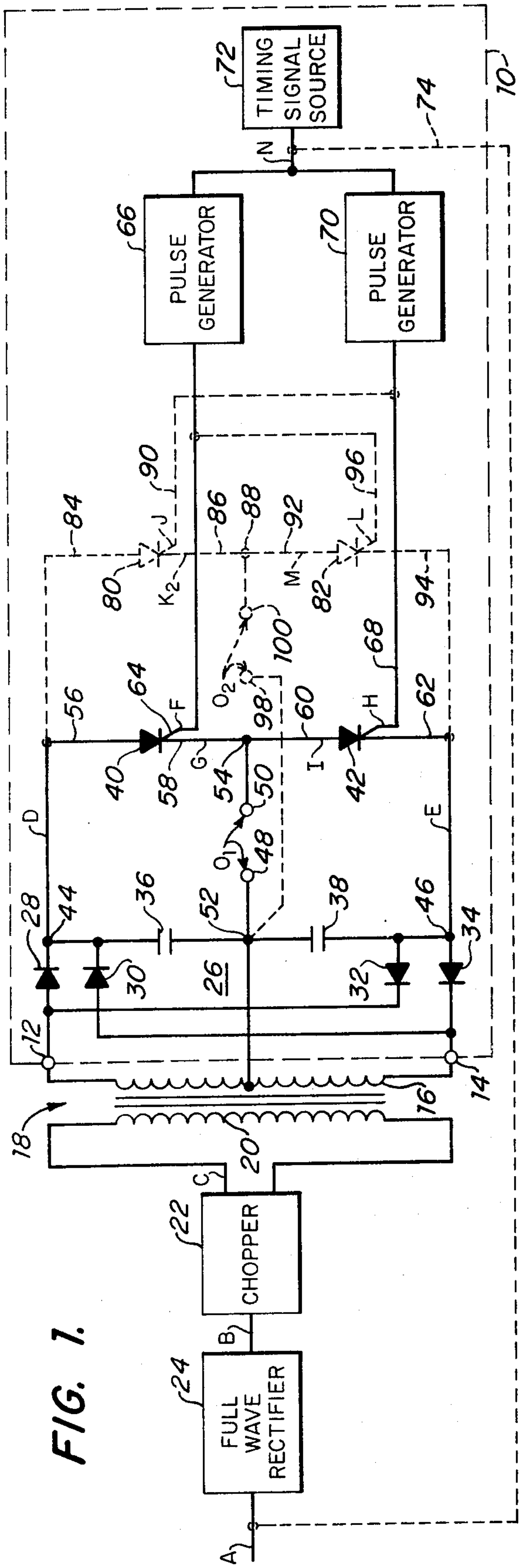
FIG. 1 is a schematic diagram of a waveform restorer circuit according to this invention and some preceding components that provide an input to that circuit.

There is shown in FIG. 1 a waveform restorer circuit 10 whose input terminals 12, 14 are connected to the secondary winding 16 of a 2,000 Hz, center tap transformer 18 whose primary winding 20 is connected to a 2,000 Hz chopper 22 driven by full wave rectifier 24. In circuit 10 terminals 12, 14, are connected to full wave rectifier 26 which includes four diodes 28, 30, 32, 34 across which are 0.1 uf/200 volt 2,000 Hz filter capacitors 36, 38. Two silicon control rectifiers (SCR) 40, 42 are connected in series across the output 44, 46 of rectifier 26. Output terminals 48, 50 are connected between the junction 52 of capacitors 36, 38 and the junction 54 of SCR's 40, 42, respectively. SCR 40 has its anode 56 connected to the output 44 of rectifier 26 and its cathode 58 connected to junction 54; SCR 42 has its anode 60 connected to junction 54 and its cathode 62 connected to output 46 of rectifier 26. Gate 64 of SCR 40 is switched by signals from pulse generator 66 and gate 68 of SCR 42 is switched by signals from pulse generator 70; both pulse generators 66, 70 are driven by a timing signal from source 72. The timing signal may come from an external source as indicated by dashed line 74 and that external source may be the original input signal supplied to rectifier 24 as further indicated by line 74.

Figure 2:
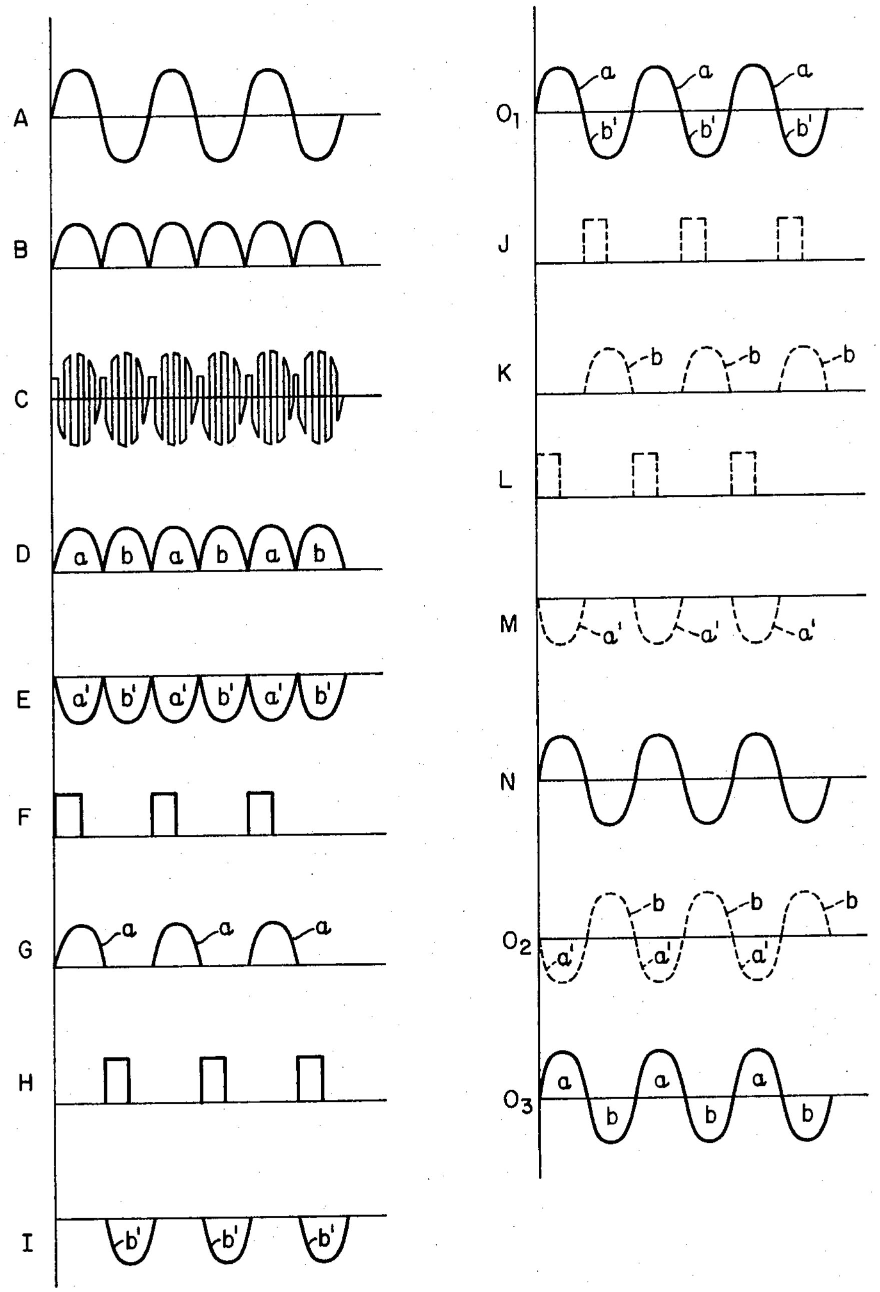
FIG. 2 is a chart of the waveforms at different points in the circuit of FIG. 1.

In operation with, for example, the fundamental waveform input signal A to rectifier 24 being a 60 Hz sinusoidal waveform A, FIG. 2, the output signal B from rectifier 24 is pulsating direct current and the output signal C from chopper 22 is a 2,000 Hz signal whose amplitude varies sinusoidally at 120 Hz. Output signal C is delivered to winding 20 and from winding 16 signal C is delivered to rectifier 26. The signal D at output 44 of rectifier 26 is pulsating in the form of a series of positive pulses a, b occurring at 120 Hz: the 2,000 Hz signal has been filtered out by capacitor 36. Similarly, the signal E at output 46 of rectifier 26 is pulsating in the form of a series of negative pulses *a'*, *b'*, occurring at 120 Hz: the 2,000 Hz signal has been filtered out by capacitor 38. Signal D appearing at anode 56 is gated through SCR 40 in accordance with signal F on gate 64 from pulse generator 66; signal F includes switching pulses occurring at 60 Hz which pass alternate pulses a and block the other pulses *b*. The result is that the signal G at cathode 58 includes only pulses a occurring at 60 Hz. Similarly, signal E is gated through SCR 42 in accordance with switching signal H from pulse generator 70 that includes switching pulses occurring at 60 Hz, which are 180 degrees out of phase with those of signal F, and which pass alternate pulses *b'* and block the other pulses *a'*. The result is that the signal I includes only pulses *b'* occurring at 60 Hz. The output signal $0_1$ appearing at terminals 48, 50 is a combination of positive a and negative *b'* pulses which constitute a 60 Hz sinusoidal waveform similar to the original input signal A which was manipulated to facilitate the use of a transformer of reduced size and weight.

A second waveform, output $0_2$, may be obtained using a second pair of SCR's 80, 82 connected in series with each other and in parallel with SCRs 40, 42 across the output terminals 44, 46 of rectifier 26. SCR 80 has its anode 84 connected to output 44 and its cathode 86 connected to junction 88. Gate 90 is connected to pulse generator 70. SCR 82 has its anode 92 connected to junction 88 and its cathode 94 connected to output 46. Gate 96 is connected to pulse generator 66. Signal D is gated through SCR 80 in accordance with signals J, identical with signals H, on gate 90 from pulse generator 70; signal J includes switching pulses occuring at 60 Hz which pass alternate pulses *b* and block the other pulses *a*. The result is that the signal K includes only pulses b occurring at 60 Hz. Similarly, signal E is gated through SCR 82 in accordance with switching signal L, identical to signal F, from pulse generator 66 that includes switching pulses occurring at 60 Hz, which are 180 degrees out of phase with those of signal J; and which pass alternate pulses *a'* and block the other pulses *b'*. The result is that the signal M includes only pulses *a'* occurring at 60 Hz. The output signal $0_2$ appearing at terminals 98, 100 is a combination of negative *a'* and positive *b* pulses which constitute a 60 Hz sinusoidal waveform similar to the original input signal A and to output signal $0_1$ but 180 degrees out of phase. Pulse generators 66 and 70 may be driven by any timing signal source 72 that produces a proper periodic pulse to reconstruct the fundamental waveform as presented at the input to rectifier 24. In the circuit of FIG. 1 source 72 may be a source of 60 Hz sinusoidal current N, such that pulse generator 66 responds to the positive portion of the signal and pulse generator 70 responds to the negative portion. Any other source may be substituted or the input signal A may itself be used as the synchronizing signal to drive pulse generators 66 and 70.

Figure 3:
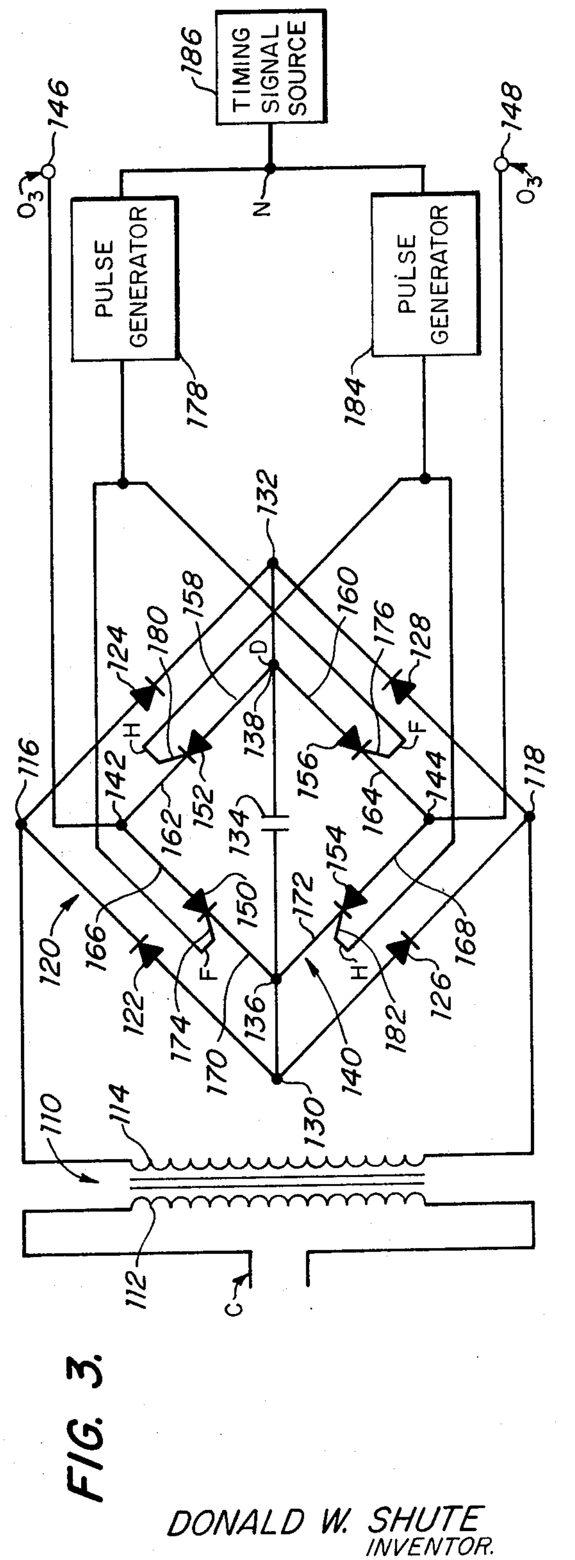
FIG. 3 is a schematic diagram of another waveform restorer circuit according to this invention.

An alternative circuit embodying this invention is shown in FIG. 3 where rectifier 24 and chopper 22 and their input signals A and B have been omitted. In the discussion of FIG. 3 some of the signals of FIG. 2 indicated as occurring on FIG. 1 are also used to indicate the waveforms occurring on FIG. 3 and an additional waveform output signal $0_3$ is added. A transformer 110 receives 2,000 Hz signal C whose amplitude varies at 120 Hz at its primary winding 112 and through secondary winding 114 submits it to the inputs 116, 118 of a full wave bridge rectifier 120 including four diodes 122, 124, 126, and 128. The signal D at output 132 of rectifier 120 is applied directly across 0.1 uf, 200 volt filter capacitor 134 so that the signal D including recurring sinusoidal pulses a and b with the 2,000 Hz waveform filtered out, appears across the input 138 of switching bridge 140. Bridge 140 having its outputs 142, 144 connected directly to the output terminals 146, 148 is formed of four SCR's 150, 152, 154, 156. SCR's 152, 156 have their anodes 158, 160 connected to input 138 and their cathodes 162, 164 connected, respectively, to outputs 142 and 144. SCR's 150, 154 have their anodes 166, 168 connected to outputs 142, 144, respectively, and their cathodes 170, 172 connected to input 136. Gates 174, 176 of SCR's 150, 156 receive signal F from pulse generator 178 and gates 180, 182 of SCR's 152, 154 receive signal H from pulse generator 184. Pulse generators 178 and 184 are similar to those shown in FIG. 1 and may be driven by a signal N from source 186 similar to that in FIG. 1.

In operation the recurring switching pulses of signal F applied to gates 174 and 176 produce sinusoidal portions a of signal D across terminals 146, 148 and the recurring switching pulses of signal H occurring 180 degrees out of phase with signal F next produce sinusoidal portions b of signal D inverted across terminals 146, 148. As a result the signal $0_3$ across the output terminals 146, 148 has a sinusoidal shaped formed of portions *a* and *b* of signal D.

Other embodiments will occur to those skilled in the art and are within the following claims:

What is claimed is:

1. A waveform restoring circuit for extracting portions of a fundamental waveform from a composite waveform and combining those portions to reproduce the fundamental waveform comprising:

means for producing a series of pulses from said composite waveform, each pulse representing a portion of said fundamental waveform;

switching means for selectively conducting said pulses; and synchronized control means for driving said switching means to conduct said pulses in a predetermined pattern for reconstructing said fundamental waveform.

2. The waveform restoring circuit of claim 1 in which said means for producing a series of pulses includes a rectifier.

3. The waveform restoring circuit of claim 1 in which said switching means includes first and second semiconductor devices for successively conducting positive-going and negative-going pulses, respectively.

4. The waveform restoring circuit of claim 1 in which said synchronized control means includes means for applying to said switching means gating signals having twice the frequency of said fundamental waveform.

5. The waveform restoring circuit of claim 2 in which said rectifier means includes a full-wave rectifier for producing a series of pulses that includes positive-going and negative-going pulses at twice the frequency of said fundamental waveform.

6. The waveform restoring circuit of claim 1 in which said switching means includes first and second semiconductor devices for conducting positive-going pulses and negative-going pulses, respectively, and third and fourth semiconductor devices for conducting positive-going and negative-going pulses, respectively.

7. The waveform restoring circuit of claim 6 in which said synchronized switching means includes means for applying to said semiconductors gating signals to enable said first and second semiconductor devices to successively conduct positive-going and negative-going pulses, respectively, and said third and fourth semiconductor devices simultaneously to successively conduct said positive-going and negative-going pulses, respectively.

8. The waveform restoring circuit of claim 3 in which said semiconductor devices are silicon control rectifiers.

9. The waveform restoring circuit of claim 6 in which said semiconductor devices are silicon control rectifiers.

10. The waveform restoring circuit of claim 1 in which said synchronized control means include pulse generating means and a source of timing signals.

* * * * *